(No Model.)
H. JANDIN.
DELIVERY PUMP.
No. 495,344. Patented Apr. 11, 1893.
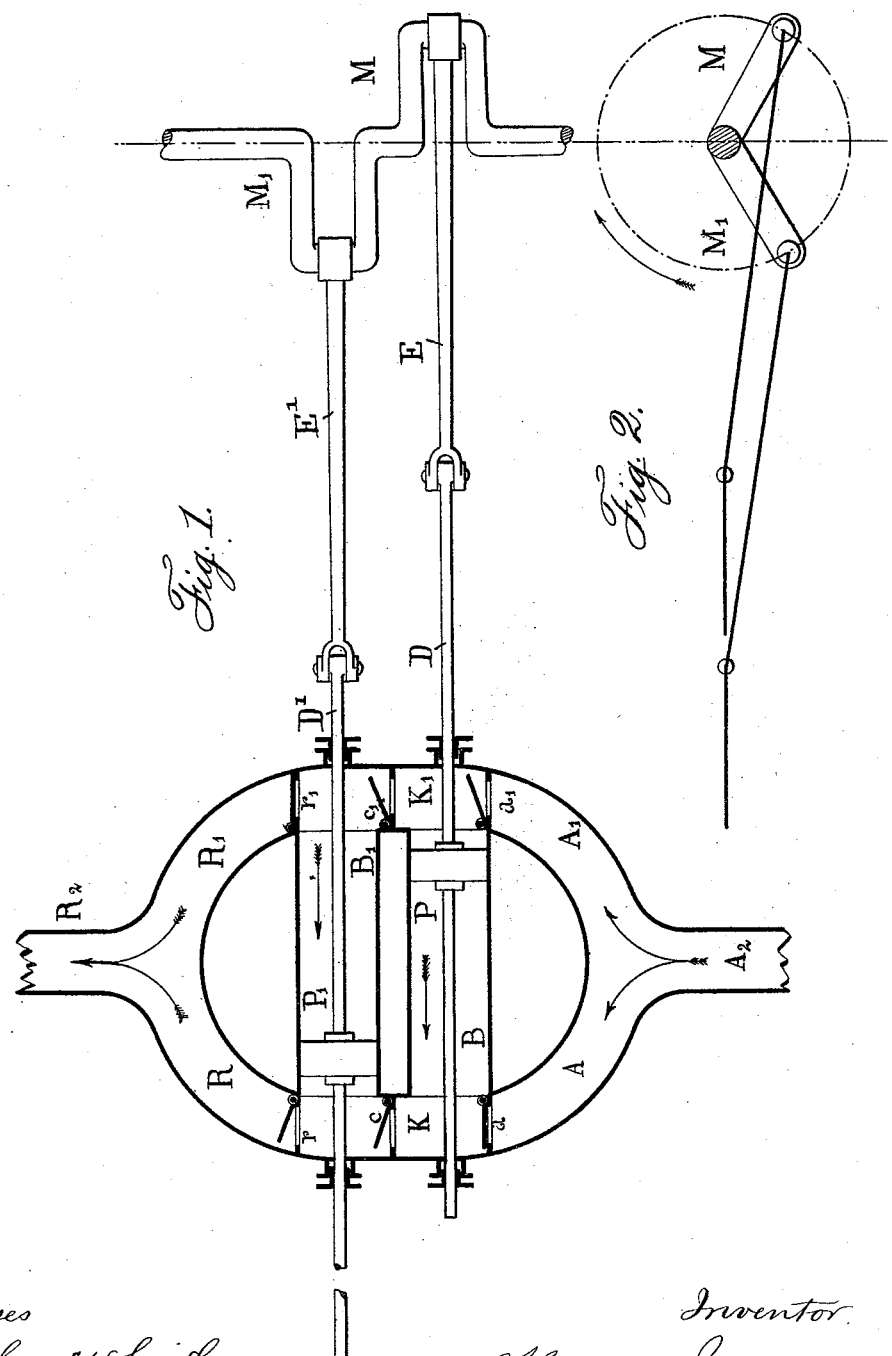

UNITED STATES PATENT OFFICE.

HENRY JANDIN, OF LYONS, FRANCE.

DELIVERY-PUMP.

SPECIFICATION forming part of Letters Patent No. 495,344, dated April 11, 1893.

Application filed June 22, 1892. Serial No. 437,563. (No model.) Patented in France October 26, 1891, No. 216,946; in Belgium October 26, 1891, No. 96,948, and in Germany November 23, 1891, No. 63,246.

*To all whom it may concern:*

Be it known that I, HENRY JANDIN, a citizen of the Republic of France, residing at 28 Cours Morand, Lyons, France, have invented a new and useful Improvement in Double-Acting Pumps, (for which patents have been granted to me as follows: in France October 26, 1891, No. 216,946; in Belgium October 26, 1891, No. 96,948, and in Germany November 23, 1892, No. 63,246,) of which the following is a specification.

My invention relates to a pump for giving an approximately continuous flow or delivery of liquid.

Heretofore in pumps where there were two cylinders whose pistons and connecting rods were actuated by cranks on the same shaft set at about a right angle to each other, the water passages were parallel with the cylinders and there were chambers in the cylinder heads connecting with said water passages and a pair of independent oppositely operative valves at each end of each cylinder in said heads. This mechanism was complicated and expensive.

In carrying out my invention the cylinders, pistons, valves and water ways are so placed that the water from either end of one cylinder passes through the water ways of the other cylinder, the water ways at the adjacent ends of the cylinders opening into the cylinders and being connected together in line and at right angles to the cylinders. In these water ways there is one pair of induction valves between the first cylinder and the inlet pipe, one pair of intermediate valves between the cylinders and one pair of discharge valves between the second cylinder and the discharge pipe, and I prefer to connect together the respective ends of the water ways to form one inlet and one discharge. The cranks are by preference placed at an angle to each other of about one hundred and twenty degrees, or in other words, at one hundred and twenty degrees apart.

In the drawings, Figure 1 is a vertical section and partial elevation showing my improvement, and Fig. 2 is a diagrammatic plan view.

The two parallel cylinders are represented at B B'. The pistons P P' move therein. D D' are the piston rods; E E' the connecting rods, and M M' the crank arms for actuating the pistons.

The respective adjacent ends of the cylinders B B' are connected together by the pipes K K'. The branch pipes A A' (preferably curved) connect the lower ends of the pipes K K' and are connected to the central suction pipe A². The branch pipes R R' (also preferably curved) connect the upper ends of the pipes K K' and are connected to the discharge pipe R². The water way pipes or chambers K K are each provided with three valves opening in the direction of the flow of liquid. The intermediate pair of valves $c\ c'$ are placed between and separate the two cylinders from each other. The lower pair of induction valves $a\ a'$ separate the cylinder B from the inlet pipes A A' and the upper pair of discharge valves $r\ r'$ separate the cylinder B' from the discharge pipes R R'. The water passes through the induction valves $a\ a'$ from the inlet pipe to either end of the cylinder B and from either end of said cylinder B through the intermediate valves $c\ c'$ and through the water ways of the cylinder B', and from either end of this cylinder B' through the discharge valves $r\ r'$ into the discharge pipe. The pistons P P' act together in the same direction or in opposite directions in drawing and forcing the liquid through the pump, and according to their direction the delivery of liquid is determined by the sum or difference in the volumes. The pistons P P' are of equal diameter and stroke and are actuated by crank arms M M' set at an angle of about one hundred and twenty degrees or thirds of the circumference of rotation.

Calculations have shown that because of thus placing the crank arms the volumes drawn and forced at each side of the pistons are equal, and also that the volume lifted is the same for each twelfth of a rotation, any difference being so small as to be inappreciable.

With my improved apparatus air chambers are unnecessary.

I claim as my invention—

1. The combination in a pump with the actuating shaft having cranks at about one hundred and twenty degrees apart and pistons and connecting devices, of two cylinders for said pistons, induction and discharge pipes and passage ways connecting together and opening into the respective adjacent ends of said cylinders and three pairs of valves in said passage ways opening in the direction of the flow, one pair being between the cylinders, one pair of induction valves and one pair of discharge valves, substantially as set forth.

2. In a pump, the combination with the cylinders B B' and pistons P P', the pipes K K' opening into said cylinders at their respective adjacent ends, and the induction, discharge and intermediate valves and the suction and discharge pipes, of the piston rods D D', the connecting rods E E', and the crank arms M M' set at an angle of about one hundred and twenty degrees apart, substantially as and for the purposes set forth.

The foregoing specification of my improvement in pumps signed by me this 3d day of June, 1892.

HENRY JANDIN.

Witnesses:
YVIN ROBILLAND,
GASTON JEANNIAUX.